United States Patent
Guo

(10) Patent No.: US 8,493,039 B2
(45) Date of Patent: Jul. 23, 2013

(54) CASCADE-CONNECTED BOOST CIRCUIT

(75) Inventor: Dong-sheng Guo, Guangdong (CN)

(73) Assignee: Shenzhen China Star Optoelectronics Co. Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/131,096

(22) PCT Filed: Apr. 14, 2011

(86) PCT No.: PCT/CN2011/072789
§ 371 (c)(1),
(2), (4) Date: May 25, 2011

(87) PCT Pub. No.: WO2012/129823
PCT Pub. Date: Oct. 4, 2012

(65) Prior Publication Data
US 2012/0249111 A1    Oct. 4, 2012

(30) Foreign Application Priority Data
Mar. 30, 2011    (CN) .......................... 2011 1 0082632

(51) Int. Cl.
*G05F 3/16*    (2006.01)
(52) U.S. Cl.
USPC .......................................... 323/225; 323/271
(58) Field of Classification Search
USPC ................. 323/225, 222–223, 266, 271, 262, 323/232
See application file for complete search history.

(56) References Cited

U.S. PATENT DOCUMENTS

| 6,034,514 | A   |   | 3/2000 | Sakai |
| 7,023,186 | B2  | * | 4/2006 | Yan ............................... 323/225 |
| 7,061,212 | B2  | * | 6/2006 | Phadke ......................... 323/222 |
| 2004/0119447 | A1 | * | 6/2004 | Kato ............................. 323/222 |
| 2010/0061122 | A1 |   | 3/2010 | Okubo et al. |

FOREIGN PATENT DOCUMENTS

| CN | 200976546 Y | 11/2007 |
| CN | 101951147 A | 1/2011 |

* cited by examiner

*Primary Examiner* — Harry Behm
*Assistant Examiner* — Matthew Grubb
(74) *Attorney, Agent, or Firm* — Harness, Dickey & Pierce, PLC

(57) ABSTRACT

A cascade-connected boost circuit is disclosed. The cascade-connected boost circuit includes a first-stage boost circuit, a second-stage boost circuit, an output terminal and a regulation filtering capacitor. The first-stage boost circuit includes an input terminal, a PWM generator, a first inductor and a first switch. The second-stage boost circuit includes a second inductor and a second switch. The PWM generator controls the first switch and the second switch to turn on or turn off simultaneously. A power supply from the input terminal respectively charges the two inductors via two paths when the two switches are turned on. The two inductors release energy when the two switches are turned off. The two switches share the voltage of the output terminal. The cascade-connected boost circuit according to the present invention solves the issues that the withstand voltage limit of a single switch and the limit of a duty cycle.

19 Claims, 3 Drawing Sheets

CASCADE-CONNECTED BOOST CIRCUIT

FIELD OF THE INVENTION

The present invention relates to a cascade-connected boost circuit.

BACKGROUND OF THE INVENTION

In DC to DC circuit, boost circuit and buck circuit are applied to many fields. FIG. 1 is a circuit diagram illustrating conventional boost circuit, which includes an input terminal Vin, an inductor L, a diode D, a switch Q, a regulation filtering capacitor C, a pulse width modulation (PWM) generator (not shown) and an output terminal Vout. The PWM signal outputted from the PWM generator includes a first pulse section in which the pulse level is high (Ton) and a second pulse section in which the pulse level is low (Toff). The sum of these two times is one period (T). The ratio of the time in which the pulse is at "Ton" to the period "T" of the pulse is referred to as duty cycle D.

The principle of operation for the boost circuit 100 is as follows. When the pulse level of the PWM signal is high, the switch Q is turned on, and the diode D is cut-off. Meanwhile, the inductor L is charged by a power supply via a path 14. When the pulse level of the PWM signal is low, the switch Q is turned off, and the diode D conducts. Under this condition, the inductor L releases energy via a path 12. Assuming that an induction electromotive force (EMF) generated by the inductor L is VL at this time, then Vout=Vin+VL, thereby achieving the effect of the boost. The Vin and VL relate to the duty cycle D, according to the law of the conservation of energy and accompanying continuous inductor current mode (CCM mode), and ultimately Vout=Vin/(1−D) can be derived.

However, if the Vout is risen to a higher voltage, the switch Q has to withstand the voltage of the Vout, so an issue of the withstand voltage limit of the switch Q occurs. In addition, it can be seen from the above-mentioned formula. In order to rise to a higher voltage, the duty cycle D needs to increase, that is, to extend the first pulse section. However, when the first pulse section closes to the period T, the switch Q may not be turned off in such a short time. Therefore, a limit that the duty cycle D can not close to 1 occurs, and the limit causes the conventional boost circuit not to achieve desired results.

SUMMARY OF THE INVENTION

Accordingly, an objective of the present invention is to provide a cascade-connected boost circuit, which solves the above-mentioned issues of the withstand voltage limit of the switch and the limit of the duty cycle D.

To achieve the foregoing objective, according to an aspect of the present invention, a cascade-connected boost circuit comprises a first-stage boost circuit, an output terminal and a regulation filtering capacitor. One end of the regulation filtering capacitor is grounded, and another end thereof is coupled to the output terminal. The first-stage boost circuit includes an input terminal, a PWM generator, a first inductor, a first diode and a first switch. One end of the first inductor is coupled to the input terminal, and another end thereof is coupled to an anode of the first diode. A controlling terminal of the first switch is coupled to the PWM generator, and a first conductive terminal thereof is grounded, and a second conductive terminal thereof is coupled to the anode of the first diode. The cascade-connected boost circuit further comprises a second-stage boost circuit, which comprises a second inductor, a second switch, a first serial diode and a first parallel diode. One end of the second inductor is coupled to a cathode of the first diode, and another end thereof coupled to the anode of the first serial diode, a cathode of the first serial diode is coupled to the output terminal. A controlling terminal of the second switch is coupled to the PWM generator, and a first conductive terminal thereof is coupled to a second conductive terminal of the first switch, and a second conductive terminal of the second switch is coupled to the anode of the first serial diode. An anode of the first parallel diode is coupled to the input terminal, and a cathode thereof is coupled to the cathode of the first diode.

Preferably, the PWM generator controls the first switch and the second switch to turn on or turn off simultaneously.

Preferably, the two switches are field effect transistors (FETs).

Preferably, the two switches are N-type FETs.

Preferably, the FETs are metal-oxide-semiconductor field-effect transistors (MOSFET).

Preferably, the controlling terminal of each switch is a gate, and the first conductive terminal thereof is a source, and the second conductive terminal thereof is a drain.

According to another aspect of the present invention, a cascade-connected boost circuit comprises a first-stage boost circuit, an output terminal and a regulation filtering capacitor. One end of the regulation filtering capacitor is grounded, and another end thereof is coupled to the output terminal. The first-stage boost circuit includes an input terminal, a PWM generator, a first inductor and a first switch. The cascade-connected boost circuit further comprises a second-stage boost circuit, which includes a second inductor and a second switch. The PWM generator controls the first switch and the second switch to turn on or turn off simultaneously. A power supply from the input terminal respectively charges the first inductor and the second inductors via two paths when the first switch and the second switch are turned on. The power supply is coupled to the output terminal via the first inductor and the second inductor, and the two inductors release energy when the first switch and the second switch are turned off. The first and second switches share a voltage of the output terminal.

According to another aspect of the present invention, a cascade-connected boost circuit comprises a first-stage boost circuit, an output terminal and a regulation filtering capacitor. One end of the regulation filtering capacitor is grounded, and another end thereof is coupled to the output terminal. The first-stage boost circuit includes an input terminal, a PWM generator, a first inductor and a first switch. The cascade-connected boost circuit further comprises a second-stage boost circuit, which includes a second inductor and a second switch. The PWM generator controls the first switch and the second switch to turn on or turn off simultaneously. When the first switch and second switch are turned on, a power supply from the input terminal is grounded via the first inductor and the first switch and also is grounded via the second inductor, the second switch and the first switch. When the two switches are turned off, the power supply is coupled to the output terminal via the first inductor and the second inductor.

Preferably, the first switch and the second switch are FETs.

Preferably, the first switch and the second switch are N-type FETs.

Preferably, the cascade-connected boost circuit further comprises a third-stage boost circuit, which includes a third inductor and a third switch. the PWM generator controls the three switches to turn on or turn off simultaneously. When the three switches are turned on, a power supply from the input terminal is grounded via the first inductor and the first switch and also is grounded via the second inductor, the second switch and the first switch and further is grounded via the third inductor, the third switch, the second switch and the first switch. When the three switches are turned off, the power supply is coupled to the output terminal through the first inductor, the second inductor and the third inductor.

Preferably, the first-stage boost circuit further comprises a first diode. One end of the first inductor is coupled to the input terminal, and another end thereof is coupled to an anode of the first diode. A controlling terminal of the first switch is coupled to the PWM generator, and a first conductive terminal thereof is grounded, and a second conductive terminal thereof is coupled to the anode of the first diode. The above-mentioned second-stage boost circuit further comprises a first serial diode and a first parallel diode, one end of the second inductor is coupled to a cathode of the first diode, and another end thereof coupled to the anode of the first serial diode. A controlling terminal of the second switch is coupled to the PWM generator, and a first conductive terminal thereof is coupled to a second conductive terminal of the first switch, and a second conductive terminal of the second switch is coupled to the anode of the first serial diode. An anode of the first parallel diode coupled to the input terminal, and a cathode thereof is coupled to the cathode of the first diode. The above-mentioned third-stage boost circuit further comprises a second serial diode and a second parallel diode. One end of the third inductor is coupled to the cathode of the first serial diode, and another end thereof is coupled to an anode of the second serial diode, and a cathode of the second serial diode is coupled to the output terminal. A controlling terminal of the third switch is electrically coupled to the PWM generator, and a first conductive terminal thereof is coupled to the second conductive terminal of the second switch, and a second conductive terminal thereof is coupled to the anode of the second serial diode. An anode of the second parallel diode is coupled to the input terminal, and a cathode thereof is coupled to the cathode of the first serial diode.

Preferably, the three switches are FETs.

Preferably, the three switches are N-type FETs.

Preferably, the controlling terminal of each switch is a gate, and the first conductive terminal thereof is a source, and the second conductive terminal thereof is a drain.

Preferably, the first-stage boost circuit further comprises a first diode. One end of the first inductor is coupled to the input terminal, and another end thereof is coupled to an anode of the first diode. A controlling terminal of the first switch is coupled to the PWM generator, and a first conductive terminal thereof is grounded, and a second conductive terminal thereof is coupled to the anode of the first diode. The cascade-connected boost circuit further comprises a third-stage boost circuit and so on until an Nth-stage boost circuit, which N is a positive integer more than 3, each stage boost circuit, except the first-stage boost circuit, includes a serial diode, an inductor, a parallel diode, a serial diode and a switch. One end of the inductor is coupled to a cathode of a previous-stage serial diode, and another end thereof is coupled to an anode of the present-stage serial diode. An anode of the parallel diode is coupled to the input terminal, and a cathode thereof is coupled to the cathode of the previous-stage serial diode. A controlling terminal of the switch is electrically coupled to the PWM generator, and a first conductive terminal thereof is coupled to a second conductive terminal of the previous-stage switch, and a second conductive terminal of the present-stage switch is coupled to the anode of the present-stage serial diode, wherein a cathode of the serial diode of the Nth-stage boost circuit is coupled to the output terminal.

Preferably, the PWM generator controls each switch to turn on or turn off simultaneously.

Preferably, each switch is N-type FET.

Preferably, the controlling terminal of each switch is a gate, and the first conductive terminal thereof is a source, and the second conductive terminal thereof is a drain.

Compared with the prior art, the cascade-connected boost circuit of the present invention further includes the second-stage boost circuit, the third-stage boost circuit and so on until the Nth-stage boost circuit for achieving more energy storage and release of the plurality of inductors by the plurality of switches turning on and turning off. Moreover, the switches are utilize to share the voltage of the output terminal, thereby solving the issues of the withstand voltage limit and the limit of the duty cycle D. Therefore, the switches of normal specifications can be used to achieve the high output voltage requirements.

It is to be understood that both the foregoing general description and the following detailed description of the present invention are exemplary and explanatory and are intended to provide further explanation of the invention as claimed:

DETAILED DESCRIPTION OF THE PREFERRED EMBODIMENTS

Figure 1:
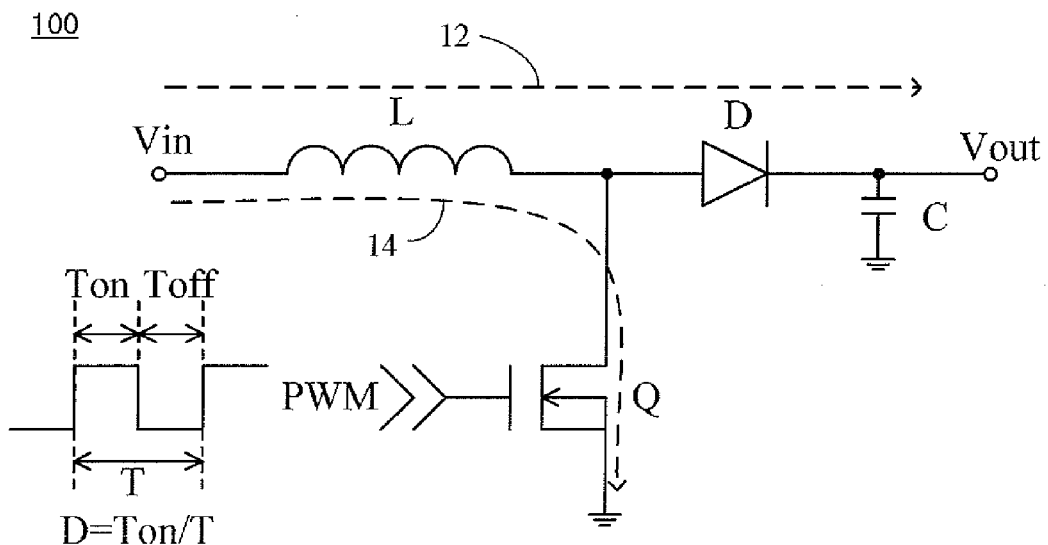
FIG. 1 is a circuit diagram illustrating conventional boost circuit.
Figure 2:
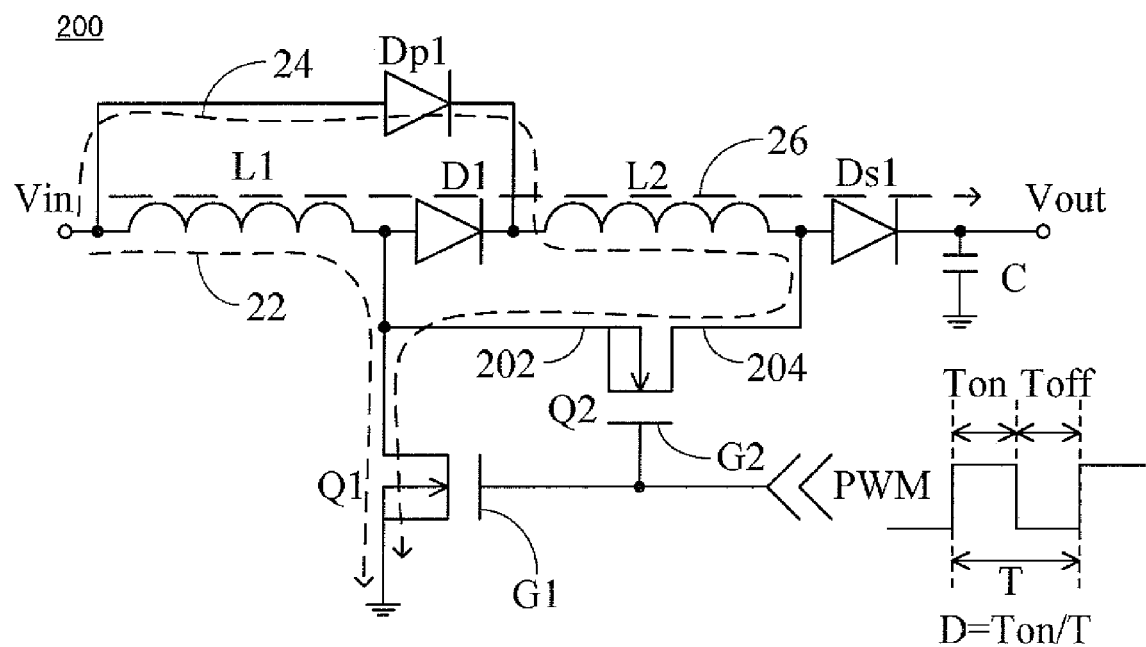
FIG. 2 is a circuit diagram illustrating a cascade-connected boost circuit according to a first preferred embodiment of the present invention.

Referring to FIG. 2, FIG. 2 is a circuit diagram illustrating a cascade-connected boost circuit according to a first preferred embodiment of the present invention. The cascade-connected boost circuit 200 includes a first-stage boost circuit, a second-stage boost circuit, a regulation filtering capacitor C and an output terminal Vout. One end of the regulation filtering capacitor C is grounded, and another end thereof is coupled to the output terminal Vout. The first-stage boost circuit includes an input terminal Vin, a first inductor L1, a first diode D1, a first switch Q1 and a PWM generator (not shown). One end of the first inductor L1 is coupled to the input terminal Vin, and another end thereof is coupled to an anode of the first diode D1. A controlling terminal G1 of the first switch Q1 is coupled to the PWM generator, and a first conductive terminal thereof is grounded, and a second conductive terminal thereof is coupled to the anode of the first diode D1.

The PWM signal outputted from the PWM generator includes a first pulse section in which the pulse level is high (Ton) and a second pulse section in which the pulse level is low (Toff). The sum of these two times is one period (T). The ratio of the time in which the pulse is at "Ton" to the period "T" of the pulse is referred to as duty cycle D.

The second-stage boost circuit includes a second inductor L2, a first parallel diode Dp1, a first serial diode Ds1 and a second switch Q2. One end of the second inductor L2 is coupled to a cathode of the first diode D1, and another end thereof is coupled to the anode of the first serial diode Ds1. A cathode of the first serial diode Ds1 is coupled to the output terminal Vout. An anode of the first parallel diode Dp1 is coupled to the input terminal Vin, and a cathode thereof is coupled to the cathode of the first diode D1. A controlling terminal G2 of the second switch Q2 is coupled to the PWM generator, and a first conductive terminal 202 thereof is coupled to a second conductive terminal of the first switch Q1, and a second conductive terminal 204 of the second switch Q2 is coupled to the anode of the first serial diode Ds1.

Specifically, the first switch Q1 and the second switch Q2 are N-type field effect transistors (FET), and more preferably are MOSFET. Furthermore, the controlling terminals G1 and G2 of the two switches Q1 and Q2 are gates, and the first conductive terminals thereof are sources, and the second conductive terminal are drains.

The PWM generator controls the first switch Q1 and the second switch Q2 to turn on or turn off simultaneously. The principle of operation for the two cascade-connected boost circuit is as follows. When the pulse level of the PWM signal is high, the first switch Q1 and the second switch Q2 are turned on, and the first parallel diode Dp1 is turned on, and the first diode D1 and the first serial diode Ds1 are cut off. Meanwhile, a power supply charges the first inductor L1 via a path 22, and the power supply charges the second inductors L2 via a path 24.

When the pulse level of the PWM signal is low, the first switch Q1 and the second switch Q2 are turned off, and the first diode D1 and the first serial diode Ds1 are turned on, and the first parallel diode Dp1 is cut off. Meanwhile, the first inductor L1 and the second inductor L2 release the energy via a path 26. Assuming that the induction electromotive forces (EMFs) generated by the first inductor L1 and the second inductor L2 are VL1 and VL2 at this time, then Vout=Vin+ VL1+VL2.

Compared with the prior art, the voltage that the first switch Q1 stands is Vin+VL1, and the voltage that the second switch Q2 stands is VL2, i.e. the voltage difference between the inductor L2. Accordingly, when the voltage is boosted, the first switch Q1 and the second switch Q2 share the voltage of the output terminal Vout. Therefore, the issues of the withstand voltage limit and the limit of the duty cycle D are solved, and then the switches of normal specifications can be used to achieve the high output voltage requirements.

Figure 3:
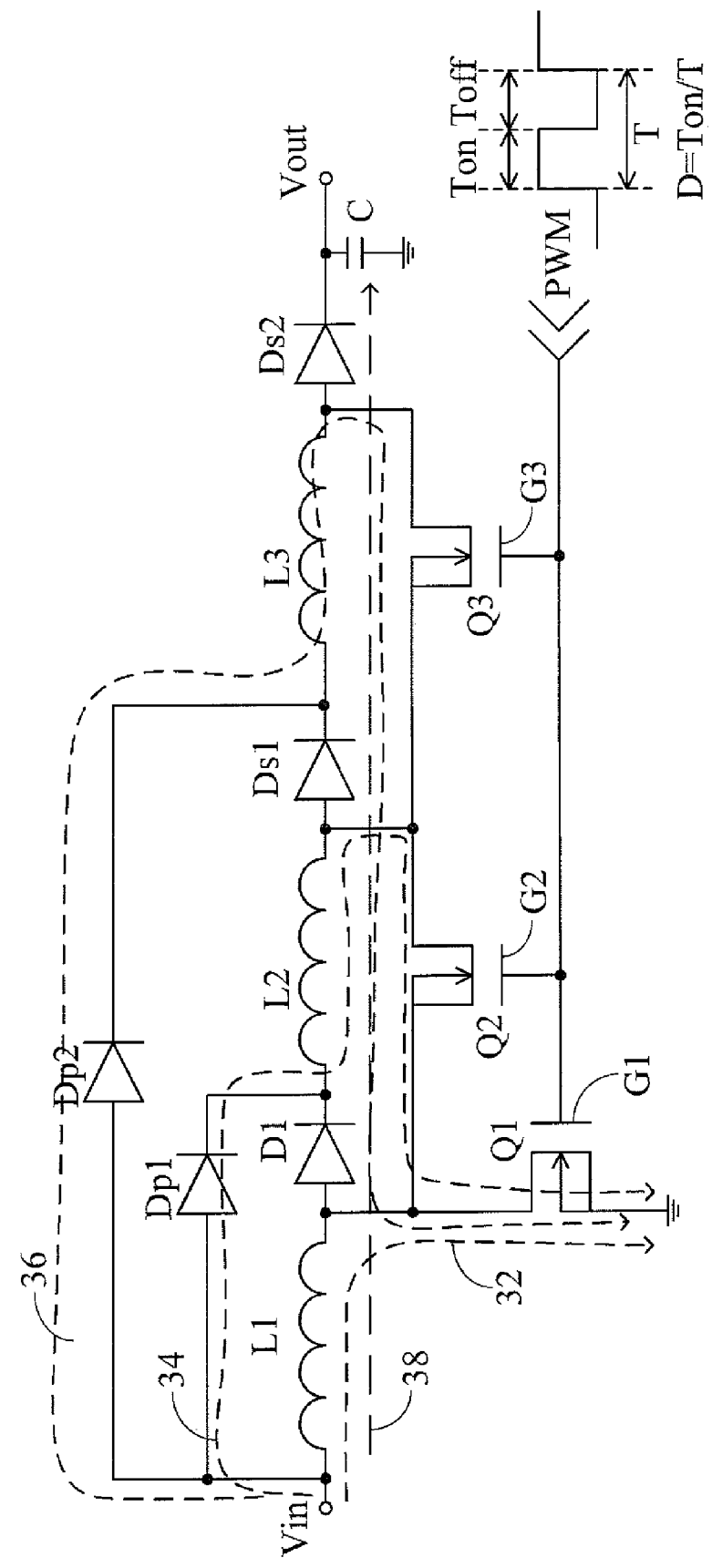
FIG. 3 is a circuit diagram illustrating a cascade-connected boost circuit according to a second preferred embodiment of the present invention.

Referring to FIG. 3, FIG. 3 is a circuit diagram illustrating a cascade-connected boost circuit according to a second preferred embodiment of the present invention. Except for the above-mentioned cascade-connected boost circuit 200 with two stages, the present invention further provides a cascade-connected boost circuit 300 with three stages. Other than the above-mentioned first-stage cascade-connected boost circuit, the regulation filtering capacitor C and output terminal Vout, the cascade-connected boost circuit 300 further includes a second-stage cascade-connected boost circuit and a third-stage boost circuit. The second-stage cascade-connected boost circuit includes a second inductor L2, a first parallel diode Dp1, a first serial diode Ds2 and a second switch Q2. The third-stage boost circuit includes a third inductor L3, a second parallel diode Dp2, a second serial diode Ds2 and a third switch Q3.

One end of the second inductor L2 is coupled to a cathode of the first diode D1, and another end thereof is coupled to the anode of the first serial diode Ds1. An anode of the first parallel diode Dp1 is coupled to the input terminal Vin, and a cathode thereof is coupled to the cathode of the first diode D1. A controlling terminal G2 of the second switch Q2 is coupled to the PWM generator, and a first conductive terminal thereof is coupled to a second conductive terminal of the first switch Q1, and a second conductive terminal of the second switch Q2 is coupled to the anode of the first serial diode Ds1.

One end of the third inductor L3 is coupled to the cathode of the first serial diode Ds1, and another end thereof is coupled to an anode of the second serial diode Ds2. A cathode of the second serial diode Ds2 is coupled to the output terminal Vout. An anode of the second parallel diode Dp2 is coupled to the input terminal Vin, and a cathode thereof is coupled to the cathode of the first serial diode Ds1. A controlling terminal G3 of the third switch is Q3 is electrically coupled to the PWM generator, and a first conductive terminal thereof is coupled to the drain of the second switch Q2, and a second conductive terminal thereof is coupled to the anode of the second serial diode Ds2.

Similarly, the PWM generator controls the first switch Q1, the second switch Q2 and the third switch Q3 to turn on or turn off simultaneously. The principle of operation for the three cascade-connected boost circuit is as follows. When the pulse level of the PWM signal is high, the first switch Q1, the second switch Q2 and the third switch Q3 are turned on, and the first parallel diode Dp1 and the second parallel diode Dp2 are turned on, and the first diode D1, the first serial diode Ds1 and the second serial diode Ds2 are cut off. Meanwhile, the power supply charges the first inductor L1 via a path 32, and the power supply charges the second inductors L2 via a path 34, and the power supply charges the third inductor L3 via a path 36.

When the pulse level of the PWM signal is low, the first switch Q1, the second switch Q2 and the third switch Q3 are turned off, and the first diode D1, the first serial diode Ds1 and the second serial diode Ds2 are turned on, and the first parallel diode Dp1 and the second parallel diode Dp2 are cut off. Meanwhile, the first inductor L1, the second inductor L2 and the third inductor L3 release the energy via a path 38. Assuming that the induction electromotive forces (EMFs) generated by the first inductor L1, the second inductor L2 and the third inductor L3 are VL1, VL2 and VL3 at this time, then Vout=Vin+VL1+VL2+VL3. Meanwhile, the voltage that the first switch Q1 stands is Vin+VL1, and the voltage that the second switch Q2 stands is VL2, i.e. the voltage difference between the inductor L2, and the voltage that the third switch Q3 stands is VL3, i.e. the voltage difference between the inductor L3. Accordingly, when the voltage is boosted, the first switch Q1, the second switch Q2 and the third switch Q3 share the voltage of the output terminal Vout.

Figure 4:
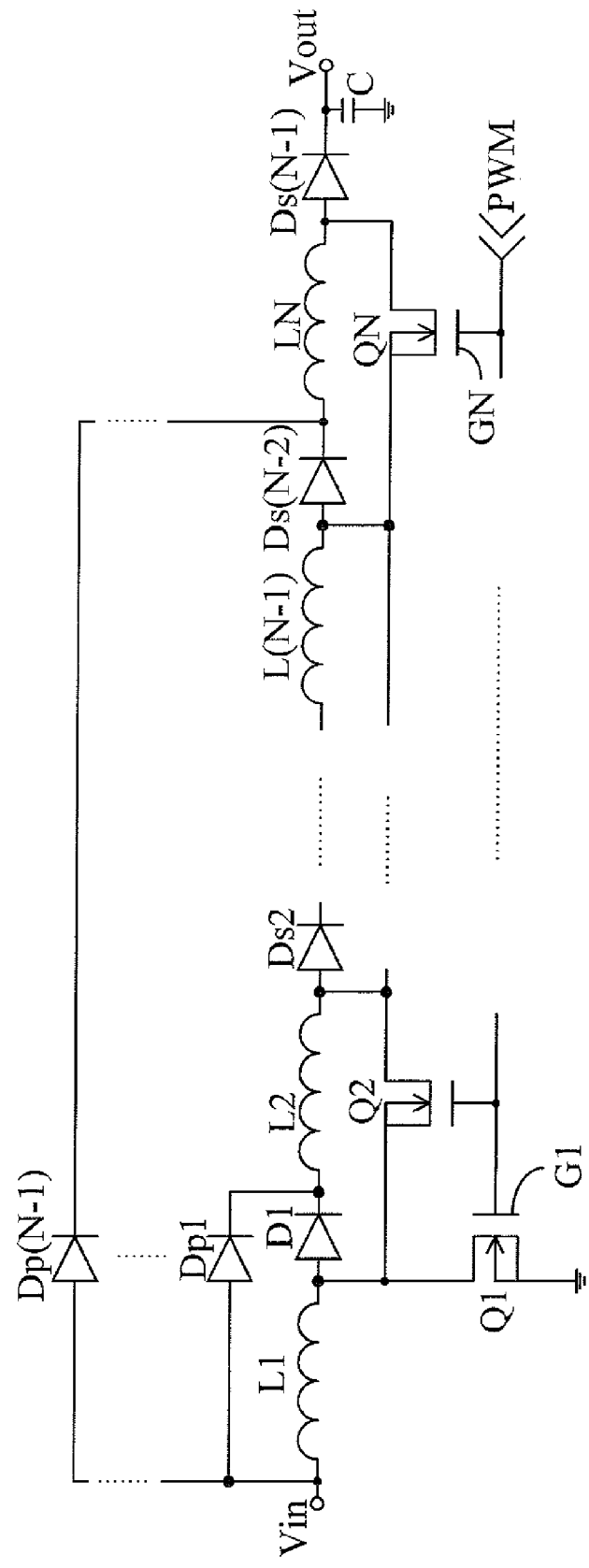
FIG. 4 is a circuit diagram illustrating a cascade-connected boost circuit according to a third preferred embodiment of the present invention.

Referring to FIG. 4, FIG. 4 is a circuit diagram illustrating a cascade-connected boost circuit according to a third preferred embodiment of the present invention. Similarly, the situation of the cascade-connected boost circuit 400 is similar to the above-mentioned. Other than the first cascade-connected boost circuit, the second cascade-connected boost circuit, the third cascade-connected boost circuit, the regulation filtering capacitor C and output terminal Vout, the cascade-connected boost circuit 400 further comprises a fourth-stage boost circuit (not shown), a fifth-stage boost circuit (not shown) and so on until an (N−1)th-stage boost circuit, and an Nth-stage boost circuit, which N is a positive integer more than 3. Each stage boost circuit includes an inductor, a parallel diode, a serial diode and a switch.

One end of the inductor is coupled to a cathode of a previous-stage serial diode, and another end thereof is coupled to an anode of the present-stage serial diode. An anode of the parallel diode is coupled to the input terminal, and a cathode thereof is coupled to the cathode of the previous-stage serial diode. A controlling terminal of the switch is electrically coupled to the PWM generator, and a first conductive terminal thereof is coupled to a second conductive terminal of the previous-stage switch, and a second conductive terminal of the present-stage switch is coupled to the anode of the present-stage serial diode, wherein a cathode of the serial diode of the Nth-stage boost circuit is coupled to the output terminal.

Using the final stage boost circuit, i.e. the Nth-stage boost circuit as an example, the Nth-stage boost circuit includes an inductor LN, a parallel diode Dp(N−1), a serial diode Ds(N−1) and a switch QN.

One end of the inductor LN is coupled to a cathode of an (N−1)th-stage serial diode Ds(N−2), and another end thereof is coupled to an anode of the present-stage serial diode Ds(N−1). An anode of the parallel diode Dp(N−1) is coupled to the input terminal Vin, and a cathode thereof is coupled to the cathode of the (N−1)th-stage serial diode Ds(N−2). A controlling terminal GN of the switch QN is electrically coupled to the PWM generator, and a first conductive terminal thereof is coupled to a second conductive terminal of the (N−1)th-stage switch Q(N−1), and a second conductive terminal of the switch QN is coupled to the anode of the present stage serial diode Ds(N−1). A cathode of the serial diode Ds(N−1) of the Nth-stage cascade-connected boost circuit is coupled to the output terminal Vout.

Reference to the aforementioned principle of operation, Vout=Vin+VL1+VL2+ . . . +VLn can be deduced. Meanwhile, Except for the voltage that the first switch Q1 stands is Vin+VL1, the voltages that each of the switches Q2, Q3, and so on until QN stand are VL2, VL3 and so on until VLN which correspond to the voltage differences respectively between the inductors L2, L3 and so on until LN. Accordingly, when the voltage is boosted, there will no switches to stand whole voltage of the output terminal Vout, and the boosted voltage will not be limited by the withstand voltage limit of the switches (such as MOSFETs). In addition, under the condition of the same duty cycle D, the output terminal Vout can be raised to very high voltage without increasing the duty cycle D.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A cascade-connected boost circuit, comprising a first-stage boost circuit, an output terminal and a regulation filtering capacitor, one end of the regulation filtering capacitor grounded, and another end thereof coupled to the output terminal, the first-stage boost circuit comprising an input terminal, a PWM generator, a first inductor, a first diode and a first switch, one end of the first inductor coupled to the input terminal, and another end thereof coupled to an anode of the first diode, a controlling terminal of the first switch coupled to the PWM generator, a first conductive terminal thereof grounded, and a second conductive terminal thereof coupled to the anode of the first diode, characterized in that the cascade-connected boost circuit further comprises a second-stage boost circuit, the second-stage boost circuit comprising a second inductor, a second switch, a first serial diode and a first parallel diode, one end of the second inductor coupled to a cathode of the first diode, and an another end thereof coupled to an anode of the first serial diode, a cathode of the first serial diode coupled to the output terminal, a controlling terminal of the second switch coupled to the PWM generator, a first conductive terminal thereof coupled to a second conductive terminal of the first switch, and a second conductive terminal of the second switch coupled to the anode of the first serial diode, a anode of the first parallel diode coupled to the input terminal, and a cathode thereof coupled to the cathode of the first diode.

2. The cascade-connected boost circuit according to claim 1, characterized in that the PWM generator controls the first switch and the second switch to turn on or turn off simultaneously.

3. The cascade-connected boost circuit according to claim 2, characterized in that the first switch and the second switch are field effect transistors.

4. The cascade-connected boost circuit according to claim 3, characterized in that the first switch and the second switch are N-type field effect transistors.

5. The cascade-connected boost circuit according to claim 3, characterized in that the field effect transistors are metal-oxide-semiconductor field-effect transistors.

6. The cascade-connected boost circuit according to claim 3, characterized in that the controlling terminal of each switch is a gate, and the first conductive terminal thereof is a source, and the second conductive terminal thereof is a drain.

7. A cascade-connected boost circuit, comprising a first-stage boost circuit, an output terminal and a regulation filtering capacitor, one end of the regulation filtering capacitor grounded and another end thereof coupled to the output terminal, the first-stage boost circuit comprising an input terminal, a PWM generator, a first inductor and a first switch, characterized in that the cascade-connected boost circuit further comprises a second-stage boost circuit, the second-stage boost circuit comprising a second inductor and a second switch, wherein the PWM generator controls the first switch and the second switch to turn on or turn off simultaneously, a power supply from the input terminal respectively charging the first inductor and the second inductors via two paths when the first switch and the second switch are turned on, the power supply being coupled to the output terminal via the first inductor and the second inductor and the first inductor and second inductors releasing energy when the first switch and the second switch are turned off, wherein the first and second switches sharing a voltage of the output terminal.

8. A cascade-connected boost circuit, comprising a first-stage boost circuit, an output terminal and a regulation filtering capacitor, one end of the regulation filtering capacitor grounded and another end thereof coupled to the output terminal, the first-stage boost circuit comprising an input terminal, a PWM generator, a first inductor and a first switch, characterized in that the cascade-connected boost circuit further comprises a second-stage boost circuit, the second-stage boost circuit comprising a second inductor and a second switch, the PWM generator controlling the first switch and the second switch to turn on or turn off simultaneously, a power supply from the input terminal being grounded via the first inductor and the first switch and also being grounded via the second inductor, the second switch and the first switch when the first switch and second switch are turned on, the power supply being coupled to the output terminal via the first inductor and the second inductor when the two switches are turned off.

9. The cascade-connected boost circuit according to claim 8, characterized in that the first switch and the second switch are field effect transistors.

10. The cascade-connected boost circuit according to claim 8, characterized in that the first switch and the second switch are N-type field effect transistors.

11. The cascade-connected boost circuit according to claim 8, characterized in that the cascade-connected boost circuit further comprises a third-stage boost circuit, the third-stage boost circuit comprising a third inductor and a third switch, the PWM generator controlling the three switches to turn on or turn off simultaneously, a power supply from the input terminal being grounded via the first inductor and the first switch and also being grounded via the second inductor, the second switch and the first switch and further being grounded via the third inductor, the third switch, the second switch and the first switch when the three switches are turned on, the power supply being coupled to the output terminal through the first inductor, the second inductor and the third inductor when the three switches are turned off.

12. The cascade-connected boost circuit according to claim 11, characterized in that the first-stage boost circuit further comprises a first diode, one end of the first inductor coupled to the input terminal and another end thereof coupled to an anode of the first diode, a controlling terminal of the first switch coupled to the PWM generator and a first conductive terminal thereof grounded and a second conductive terminal thereof coupled to the anode of the first diode, wherein the second-stage boost circuit further comprises a first serial diode and a first parallel diode, one end of the second inductor coupled to a cathode of the first diode, and another end thereof coupled to the anode of the first serial diode, a controlling terminal of the second switch coupled to the PWM generator, and a first conductive terminal thereof coupled to a second conductive terminal of the first switch, and a second conductive terminal of the second switch coupled to the anode of the first serial diode, a anode of the first parallel diode coupled to the input terminal, and a cathode thereof coupled to the cathode of the first diode, wherein the third-stage boost circuit further comprises a second serial diode and a second parallel diode, one end of the third inductor coupled to the cathode of the first serial diode, and another end thereof coupled to an anode of the second serial diode, and a cathode of the second serial diode coupled to the output terminal, a controlling terminal of the third switch electrically coupled to the PWM generator, and a first conductive terminal thereof coupled to the second conductive terminal of the second switch, and a second conductive terminal thereof coupled to the anode of the second serial diode, a anode of the second parallel diode coupled to the input terminal, and a cathode thereof coupled to the cathode of the first serial diode.

13. The cascade-connected boost circuit according to claim 12, characterized in that the three switches are field effect transistors.

14. The cascade-connected boost circuit according to claim 13, characterized in that the three switches are N-type field effect transistors.

15. The cascade-connected boost circuit according to claim 13, characterized in that the controlling terminal of each switch is a gate, and the first conductive terminal thereof is a source, and the second conductive terminal thereof is a drain.

16. The cascade-connected boost circuit according to claim 8, characterized in that the first-stage boost circuit further comprises a first diode, one end of the first inductor coupled to the input terminal, and another end thereof coupled to an anode of the first diode, a controlling terminal of the first switch coupled to the PWM generator and a first conductive terminal thereof grounded and a second conductive terminal thereof coupled to the anode of the first diode, the cascade-connected boost circuit further comprises a third-stage boost circuit and so on until an Nth-stage boost circuit, which N is a positive integer more than 3, each stage boost circuit, except the first-stage boost circuit, comprising a serial diode, an inductor, one end of the inductor coupled to a cathode of a previous-stage serial diode, and another end thereof coupled to an anode of the present-stage serial diode; a parallel diode, an anode of the parallel diode coupled to the input terminal, and a cathode thereof coupled to the cathode of the previous-stage serial diode; and a switch, a controlling terminal of the switch electrically coupled to the PWM generator, and a first conductive terminal thereof coupled to a second conductive terminal of the previous-stage switch, and a second conductive terminal of the present-stage switch coupled to the anode of the present-stage serial diode, wherein a cathode of the serial diode of the Nth-stage boost circuit is coupled to the output terminal.

17. The cascade-connected boost circuit according to claim 16, characterized in that the PWM generator controls each switch to turn on or turn off simultaneously.

18. The cascade-connected boost circuit according to claim 16, characterized in that each switch is an N-type field effect transistor.

19. The cascade-connected boost circuit according to claim 18, characterized in that the controlling terminal of each switch is a gate, and the first conductive terminal thereof is a source, and the second conductive terminal thereof is a drain.

* * * * *